US006882928B2

(12) United States Patent
Yurgil

(10) Patent No.: US 6,882,928 B2
(45) Date of Patent: Apr. 19, 2005

(54) ENHANCED DIAGNOSIS OF A MULTI-BANKED CATALYST EXHAUST SYSTEM

(75) Inventor: James R. Yurgil, Livonia, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/409,512

(22) Filed: Apr. 8, 2003

(65) Prior Publication Data

US 2004/0204817 A1 Oct. 14, 2004

(51) Int. Cl.[7] .............................................. G06F 19/00
(52) U.S. Cl. ......................... 701/114; 123/691; 60/274
(58) Field of Search ................................ 701/114, 115, 701/109; 123/691, 692; 60/274, 276

(56) References Cited

U.S. PATENT DOCUMENTS

| | | | | |
|---|---|---|---|---|
| 4,604,701 A | * | 8/1986 | Fujawa et al. ................. | 701/99 |
| 6,155,242 A | * | 12/2000 | Kotwicki et al. ............ | 123/704 |
| 6,167,754 B1 | * | 1/2001 | Koenders ..................... | 73/116 |
| 6,425,242 B2 | * | 7/2002 | Booth et al. .................. | 60/277 |
| 6,467,254 B1 | * | 10/2002 | Cullen et al. ................. | 60/274 |
| 6,550,240 B2 | * | 4/2003 | Kolmanovsky et al. ....... | 60/285 |
| 6,691,669 B2 | * | 2/2004 | Surnilla et al. ............. | 123/295 |

* cited by examiner

*Primary Examiner*—John T. Kwon
(74) *Attorney, Agent, or Firm*—Christopher DeVries

(57) ABSTRACT

Methods and apparatus are provided for diagnosing emissions in a multi-banked catalyst emissions system for a motor vehicle. A method of diagnosing emissions in a multi-banked emissions system suitably includes obtaining an emissions measurement for each bank in the multi-banked emissions system, converting the emissions measurements to scaled values, adding the scaled values to obtain a total emission value, and triggering an indication if the total emission value exceeds a pre-determined maximum. A system for processing emissions from an engine in a motor vehicle typically includes multiple exhaust banks and a processor. Each of the exhaust banks includes a catalytic converter and at least one oxygen sensor. The processor receives measurements from the oxygen sensors, converts the measurements to scaled values as a percentage of a threshold value, computes a total emission value from the scaled values, and triggers an indication if the total emission value exceeds the threshold value.

14 Claims, 5 Drawing Sheets

ENHANCED DIAGNOSIS OF A MULTI-BANKED CATALYST EXHAUST SYSTEM

FIELD OF THE INVENTION

The present invention generally relates to vehicle exhaust systems, and more particularly relates to diagnosis of a multi-banked catalyst exhaust system.

BACKGROUND OF THE INVENTION

Because vehicle exhaust generates a large percentage of air pollutants, particularly in major cities, several state, municipal and federal government agencies regulate the emissions produced by certain vehicles. The United States Environmental Protection Agency (EPA) and the California Air Resources Board (CARB) are examples of government agencies currently regulating vehicle emissions. The On Board Diagnostic (OBD2) regulations promulgated by the EPA, for example, not only limit the amount of emissions legally produced by a vehicle, but also require that each vehicle monitor the emissions produced and issue a notification to the driver if emissions exceed a specified threshold. Vehicle emissions that are commonly regulated include carbon monoxide (CO), hydrocarbons/volatile organic compounds (VOCs) and nitrogen oxides (NOx).

Generally, automobiles and other vehicles are equipped with catalytic converters or other devices to reduce emissions produced by the engine. Catalytic converters reduce emissions by exposing exhaust from the engine to one or more chemical catalysts to reduce various pollutants to relatively harmless substances such as nitrogen, carbon dioxide and water. A conventional catalytic converter typically includes a reduction catalyst such as platinum or rhodium to reduce NOx emissions, as well as an oxidation catalyst such as platinum or palladium. Unburned VOCs and carbon monoxide are typically reduced by burning the materials in the presence the oxidation catalyst.

Oxygen for the catalytic burning process is typically obtained from the vehicle exhaust itself by controlling the air-to-fuel mixture provided to the engine. Oxygen may be further stored within the catalytic converter by ceria, cerium oxide or another catalyst material. The ability of a catalyst to store oxygen during periods of lean fuel mixture and to release the oxygen during periods of rich fuel mixture is referred to as the "oxygen storage capacity" of the converter. Oxygen storage capacity (OSC) may be measured by comparing the amounts of oxygen present in the gases entering and leaving the catalytic converter. Because the OSC tends to degrade as the catalysts age, OSC is generally considered to be a good indicator of catalytic converter effectiveness.

Many vehicles, particularly those equipped with V-6, V-8 and other relatively large engines, increasingly feature multi-banked exhaust systems. A multi-banked exhaust system includes multiple exhaust paths (i.e., "banks") emanating from different cylinders in the engine. A dual-exhaust system, for example, typically includes two separate banks, each emanating from one bank of cylinders. Each bank typically includes its own catalytic converter, muffler and tailpipe such that exhaust gases from each bank are kept separate from those in the other banks until the gases are expelled from the vehicle. Difficulty frequently arises, then, in monitoring the total emissions of the vehicle, since no single point of measurement typically exists in a multi-banked system. Because most government regulations limit the amount of emissions on a per-vehicle basis instead of a per-bank basis, a conversion is needed between bank measurements and total vehicle emissions.

Accordingly, it is desirable to create an emissions diagnosis technique for multi-banked vehicle exhaust systems. In addition, it is desirable to create a multi-banked exhaust system that is capable of monitoring emissions from each bank. Furthermore, other desirable features and characteristics of the present invention will become apparent from the subsequent detailed description and the appended claims, taken in conjunction with the accompanying drawings and this background of the invention.

BRIEF SUMMARY OF THE INVENTION

Methods and apparatus are provided for diagnosing emissions in a multi-banked catalyst emissions system for a motor vehicle. A method of diagnosing emissions in a multi-banked emissions system suitably includes obtaining an emissions measurement for each bank in the multi-banked emissions system, converting the emissions measurements to scaled values, adding the scaled values to obtain a total emission value, and triggering an indication if the total emission value exceeds a pre-determined maximum. A system for processing emissions from an engine in a motor vehicle typically includes multiple exhaust banks and a processor. Each of the exhaust banks includes a catalytic converter and at least one oxygen sensor. The processor receives measurements from the oxygen sensors, converts the measurements to scaled values as a percentage of a threshold value, computes a total emission value from the scaled values, and triggers an indication if the total emission value exceeds the threshold value.

BRIEF DESCRIPTION OF THE DRAWINGS

Various exemplary embodiments of the present invention will hereinafter be described in conjunction with the following drawing figures, wherein like numerals denote like elements.

DESCRIPTION OF THE PREFERRED EMBODIMENTS

The following detailed description is exemplary in nature and is not intended to limit the invention or the application and uses of the invention. Furthermore, there is no intention to be bound by any theory presented in the preceding background of the invention or the following detailed description of the drawings.

According to various embodiments of the invention, emission measurements from each bank of a multi-banked exhaust system are scaled to a common reference, added together, and compared to a threshold value to diagnose issues with the exhaust system. One scaling technique involves expressing each measurement as a percentage of a threshold value such as a government-mandated emissions limit. The scaled measurements are appropriately added together, and the total scaled emissions can be readily compared to the threshold value to verify that the total vehicle emissions are in compliance with government mandates. In a further embodiment, banks that fail the test can be identified, and/or an operator can be notified that one or more banks should be checked.

Figure 1A:
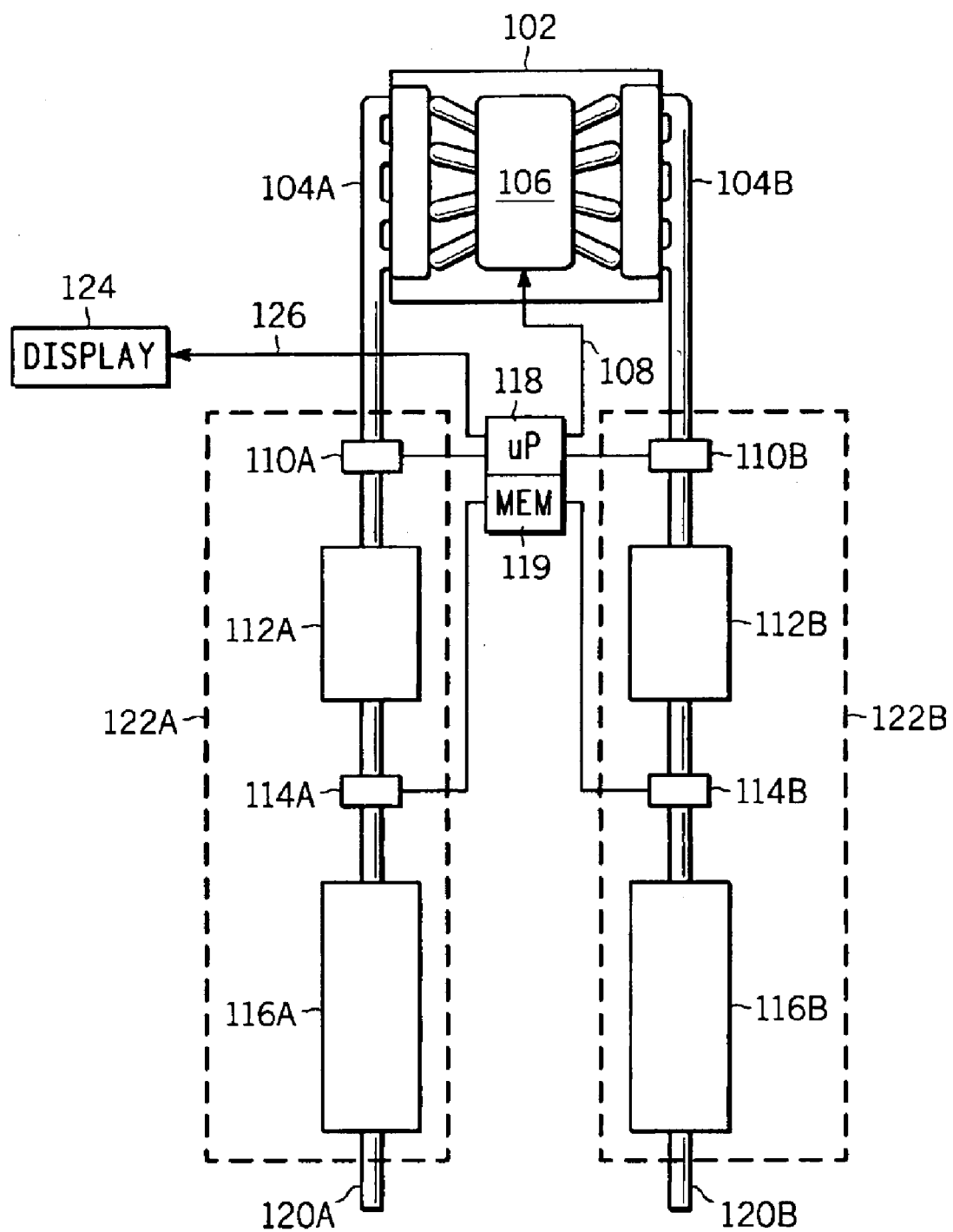
FIG. 1A is a block diagram of an exemplary multi-banked catalyst exhaust system.

With reference now to FIG. 1A, an exemplary multi-banked exhaust system 100 suitably includes an engine 102 providing exhaust through one or more manifolds 104A–B to exhaust banks 122A–B. Each exhaust bank 122A–B suitably includes a front oxygen sensor 110A–B, a catalytic converter 112A–B, a rear oxygen sensor 114A–B, and a muffler 116A–B. Exhaust gases are processed by catalytic converter 112A–B to reduce or remove certain pollutants, and the resulting gases are expelled from the vehicle through tailpipe 120A–B. Although two manifolds 104A–B and two exhaust banks 122A–B are shown in FIG. 1A, any number of manifolds and/or exhaust banks could be used in alternate embodiments. Further, it is not necessary that each exhaust bank correlate to its own manifold; a single manifold 104 could provide exhaust to multiple exhaust banks 122, for example.

In operation, a microprocessor or other controller 118 obtains data from oxygen sensors 110A–B and 114A–B to monitor the emissions produced by each bank 122A–B. In one embodiment, controller 118 computes the oxygen storage capacity (OSC) of each catalytic converter 112A–B by comparing the amount of oxygen in gases entering and leaving each converter. The computed OSC for each bank 122A–B is then appropriately scaled and processed to accurately assess the emissions produced by each bank 122A–B. In response to the computed data, controller 118 provides one or more engine control signals 108 to the fuel injection system 106 to control the engine fuel-air mixture as appropriate to adjust the emissions from banks 122A–B. Controller 118 may also provide a display control signal 126 to a display 124 (which may be a dashboard light or other indication) to notify the operator of the vehicle when maintenance or other issues arise. In one embodiment, controller 118 is implemented as a digital microcontroller with associated memory 119 and input/output circuitry on a single board, although of course other hardware implementations could be used in alternate embodiments. Examples of controllers 118 include electronic control units (ECUs) or power train control modules (PCMs) commonly found on many production vehicles.

Figure 1B:
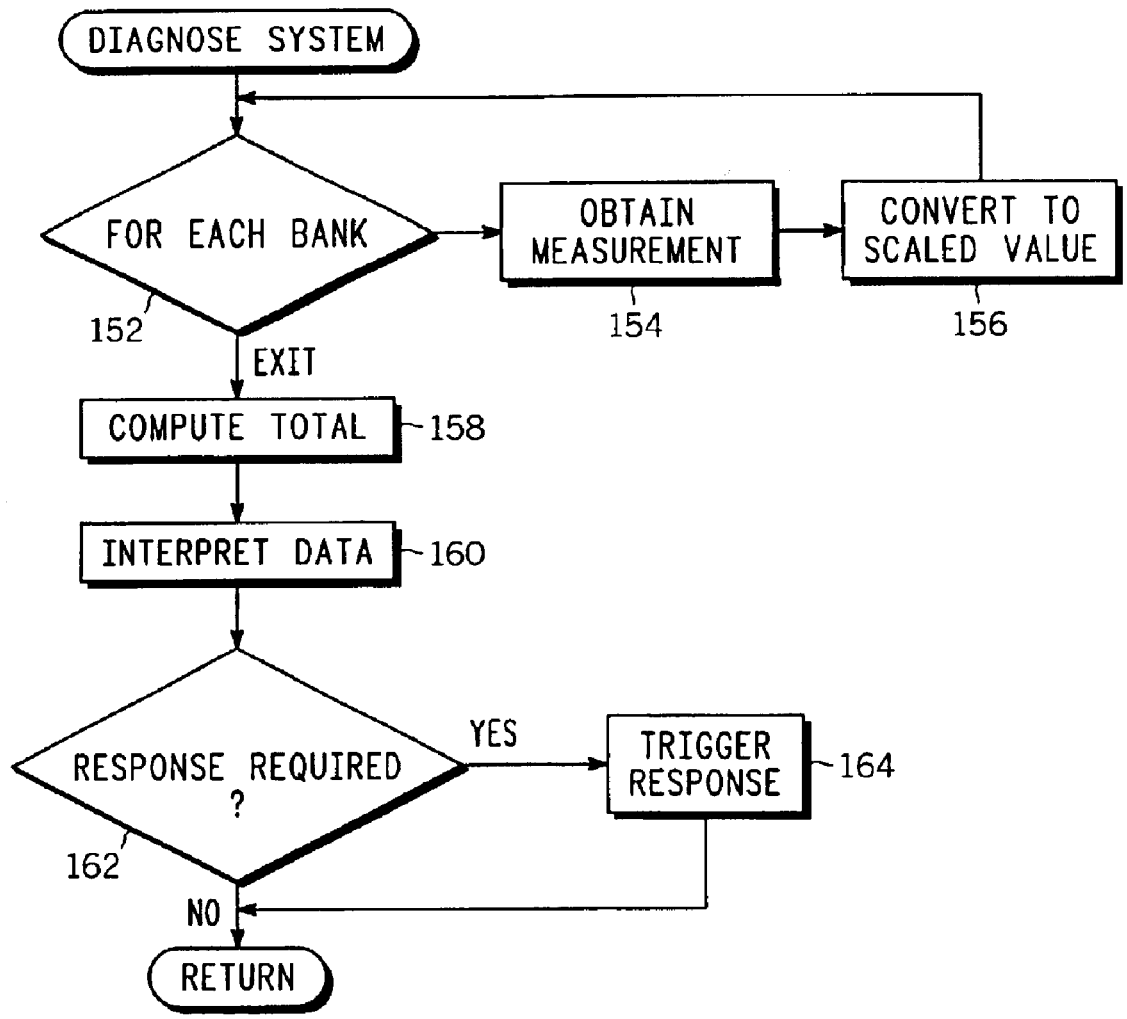
FIG. 1B is a flowchart of an exemplary diagnosis routine for a multi-banked catalyst exhaust system.

Referring now to FIG. 1B, an exemplary process 150 for diagnosing a multi-bank exhaust system suitably includes the steps of gathering and scaling data from each bank (steps 154 and 156, respectively), computing a total emission value for the vehicle (step 158), interpreting the data (step 160), and triggering an appropriate response (step 164). Each of the steps in process 150 may be implemented with computer-executable instructions that are stored in a digital memory 119 and that are appropriately executed by controller 118 (FIG. 1A), or by any other processor associated with the vehicle. Process 150 may be executed at any time during vehicle operation, including at vehicle start-up, at any time period during operation, upon instruction by an external process or control, or at any other time. In one embodiment, process 150 is executed at vehicle start-up and at regular intervals thereafter.

Process 150 begins by obtaining emissions data from each exhaust bank 122A–B (step 154) and converting the gathered data to a normalized scale (step 156) in any manner. Although FIG. 1B shows the data gathering/scaling process as taking part within a FOR-loop structure 152, any looping or other repetitive process (e.g., WHILE looping) could be used in various equivalent embodiments. Similarly, data collection (step 154) may take place in a separate processing loop from data scaling. That is, data may be collected from multiple banks prior to scaling of some or all of the data values. Accordingly, any routine for gathering and scaling data values from multiple exhaust banks should be considered as an equivalent to the FOR-loop structure 152 shown in FIG. 1B.

Obtaining emissions data measurements (step 154) takes place according to any technique. In an exemplary embodiment that implements the ODB2 standard, for example, an indication of the amount of emissions being produced by a particular exhaust bank 122 (FIG. 1A) may be determined by computing the OSC for one or more catalysts used in the bank. According to this method, the time between drops in the nominal voltages of the front and rear oxygen sensors 110 as a result of a change from a rich to a lean engine operating condition are measured. For a good, new catalyst, the time delay between the transitions of the front and rear sensor voltages will be significantly longer (e.g., about 1.5 times longer) than for an older catalyst that is considered to be "marginal" by established emission standards. By tracking the time delay between the transitions, then, the OSC for the catalyst can be effectively monitored in controller 118. OSC is known to be closely correlated with emissions quality. Any sort of emissions measurements or other emissions data collection, however, could be used in alternate embodiments of step 154. Data collection could include gathering data about a particular pollutant or other emissions component, for example, or could involve tracking another parameter (such as temperature) of the emissions, catalytic converter and/or catalysts. Any measurement or data point indicative of the content or quality of emissions from each bank should be considered as an equivalent of the embodiment described herein. Examples of catalyst measurement techniques that could be used to obtain data about each bank are shown in U.S. Pat. Nos. 6,192,324; 5,444,974; 5,509,267 and 6,436,712.

In an optional embodiment, data collection may include the substitution of maximum or minimum data values if observed data measurements fall outside of measurement thresholds. New catalytic converters, for example, will typically exhibit relatively high values for OSC that can require a significant amount of time to accurately measure. To shorten the time consumed by the diagnostic routine 150, then, a maximum OSC value may be assumed when the delay times discussed above exceed an acceptable level, since longer delay times would only result in a higher OSC (e.g., a better emissions quality) for the bank. Similarly, if the OSC of one bank is discovered to exceed the emissions threshold for the entire vehicle, a maximum value could replace the actual measurement without requiring detailed calculation of the exact OSC. Other measured parameters (e.g., pollutant levels or temperature readings) may be replaced with similar maximum or minimum values when such replacement can be demonstrated to have negligible effects upon the overall results of process 150.

Figure 2:
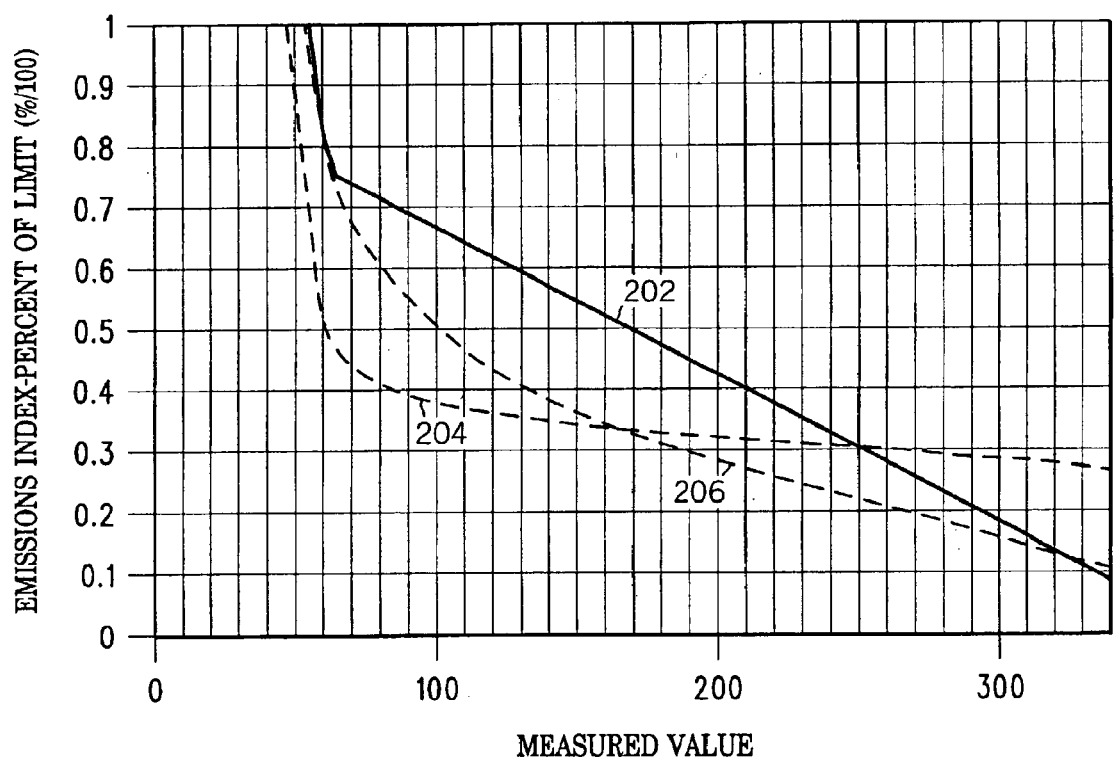
FIG. 2 is a chart of an exemplary mapping of measured values to a percent-of-threshold scale.

Although each emissions measurement obtained from an exhaust bank is indicative of the quality of emissions from that particular bank, no single emissions measurement provides an accurate indication of whether the entire vehicle exceeds a government-imposed threshold for total emissions. With momentary reference to FIG. 2, plots 202, 204 and 206 show translations from observed data (e.g., OSC measurements) to a percent of a legislated limit for various pollutants. Plot 206, for example, shows a translation of OSC to a percentage of the failure limit for nitrogen oxides (NOx), whereas plot 204 shows a similar relationship for a particular hydrocarbon (NMHC). Plot 202 is a piecewise-linear approximation of plot 206 that may be used to simplify analysis or to reflect limited data accumulation. Plots 202, 204 and 206 may be readily obtained from government regulations, experimental data and/or other sources. As shown in FIG. 2, OSC exhibits a non-linear relationship as a percent of a legislated limit (PLL) for each particular pollutant. That is, a 50 mg reduction in OSC from 300 mg to 250 mg produces a much smaller effect on the maximum threshold value than a 50 mg reduction from 100 mg to 50 mg. Accordingly, direct arithmetic combination of OSC measurements from multiple banks produces a meaningless result in determining compliance because of the non-linear nature of the legislated limits.

Accordingly, after obtaining an emissions measurement from one or more banks, each emissions measurement is appropriately converted (step 156 in FIG. 1B) to a scaled value that can be meaningfully combined and processed with other scaled values. One technique for scaling the value is to express each emissions measurement as a percentage of a threshold value. The threshold may be based upon a legislated value, for example, or may be based upon experimental data or any other factor. In one embodiment, the threshold may be an ODB2 maximum oxygen storage capacity value that may be adjusted as appropriate to provide a true indication of "maximum" OSC that is within the tolerance of the regulation. In various embodiments, the true "maximum" threshold may be a multiple of a government-imposed target, or may incorporate other scaling as appropriate.

Data conversion takes place within controller 118 through any appropriate processing technique, such as through the use of a lookup table, conversion algorithm or the like. A lookup table, for example, could be used to convert OSC or other emissions measurements to corresponding percentages of legislated limits (or of any other maximum threshold) for total vehicle emissions. Such a lookup table may be stored in digital memory 119 associated with controller 118 or in any other appropriate location. In such embodiments, controller 118 suitably accesses the lookup table to reference and obtain scaled values for each bank's emissions measurement. Data stored in the table (and as shown in FIG. 2) may be obtained from experimental data, governmental sources, or the like.

Alternatively, controller 118 may compute accurate PLL values (e.g., as shown on the vertical axis of FIG. 2) from any measured value (e.g., horizontal axis of FIG. 2) using a "best fit" equation of $2^{nd}$, $3^{rd}$ or other appropriate order that approximates one or more of the plots 202, 204 and/or 206. Other embodiments may incorporate other techniques for scaling observed measurements to percentages of threshold limits. Further, the threshold limit may be obtained from any source such as governmental regulations, design specifications, environmental standards or the like.

After scaled values are obtained for the emissions measurements from each bank, the scaled values may be added together to obtain a total emission value for the multi-banked emissions system (step 158 in FIG. 1B). Because the total emission value is computed as a function of scaled values rather than raw measurement data, the computed sum accurately reflects the total emissions of the vehicle, and can be readily compared to the government-imposed emissions limits or other thresholds. As an example, if a first bank has a scaled value of 0.34 and a second bank has a scaled value of 0.23, it can be readily determined from the sum of the scaled values that the total emissions from the vehicle are at 57% of the threshold.

Figure 3:
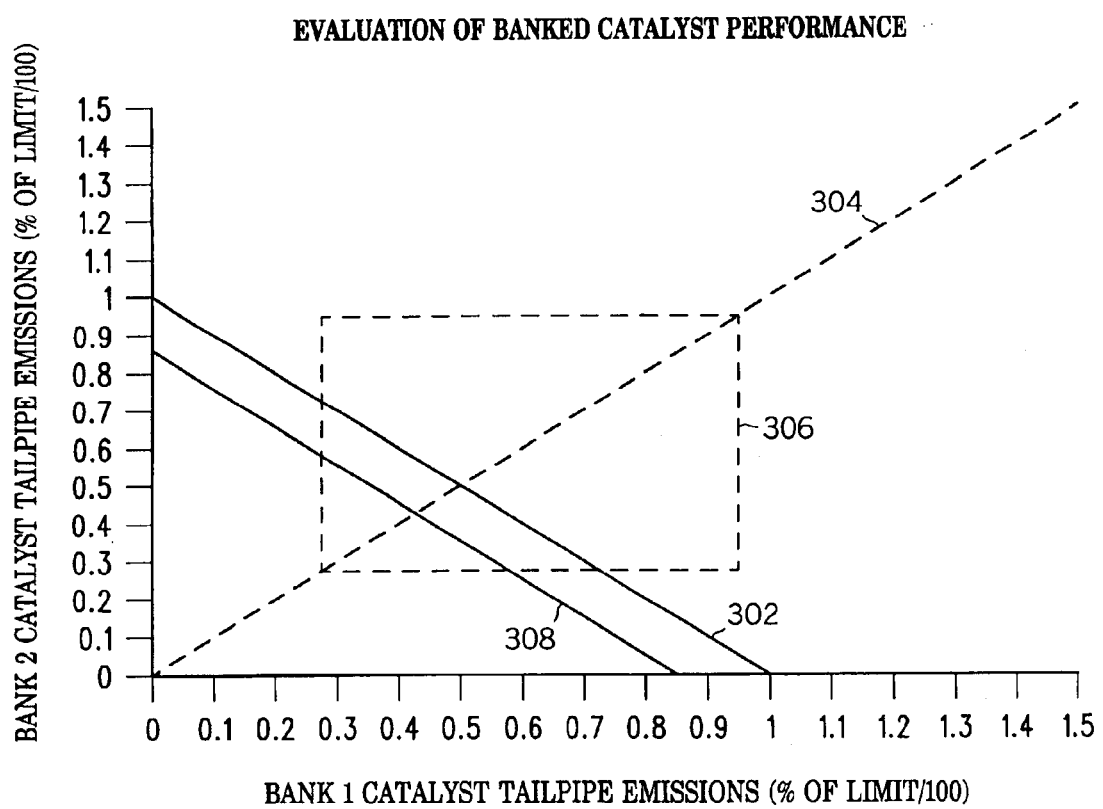
FIG. 3 is a chart of an exemplary mapping for scaled multi-banked exhaust system diagnosis results.

Interpretation of the data (step 160 in FIG. 1B) suitably includes reviewing the scaled values and/or the total emission value to determine whether an alert should be triggered, or whether some other action should be taken. FIG. 3 is a conceptual plot 300 of scaled values for a two-bank emissions system, with scaled values for Bank1 plotted on the horizontal axis and scaled values for Bank2 plotted on the vertical axis. Generally speaking, the emissions for the entire vehicle can be determined to exceed the threshold if the plot of scaled values for the two banks lies to the right of line 302, which represents 100% of the emissions threshold. Similarly, the emissions for the entire vehicle can be determined not to exceed the threshold if the plot of scaled values lies to the left of line 302. In various embodiments, an "artificial threshold" 308 may be imposed slightly to the left of actual threshold 302 to ensure a comfortable margin for measurement inaccuracies and the like, and/or to provide an indication that emissions are increasing so that the operator can address the issue before actual threshold 302 is exceeded. Plot 300 also shows an equal catalyst aging performance line 304 indicating the points of operation where two banks are operating approximately identically. In various embodiments, significant deviations from equal aging line 304 could be tracked to determine if one bank is aging faster than another. In various embodiments that include the substitution of maximum or minimum data values during data collection (as discussed above), results plotted on plot 300 will typically lie within a detectable range 306 that is bounded by maximum and minimum values. In the exemplary plot 300 shown in FIG. 3, for example, the OSC for each bank is assumed to be between 30% and 100% of the threshold value. If measurement indicates that the values lie outside of this range, a passing or failing result can be assumed, as described more fully below. Of course, plot 300 shown in FIG. 3 is intended as a conceptual model to aid in understanding scaled values; the concepts disclosed therein may be readily modified to plots having three, four or any other number of dimensions corresponding to exhaust systems having any number of banks.

Figure 4:
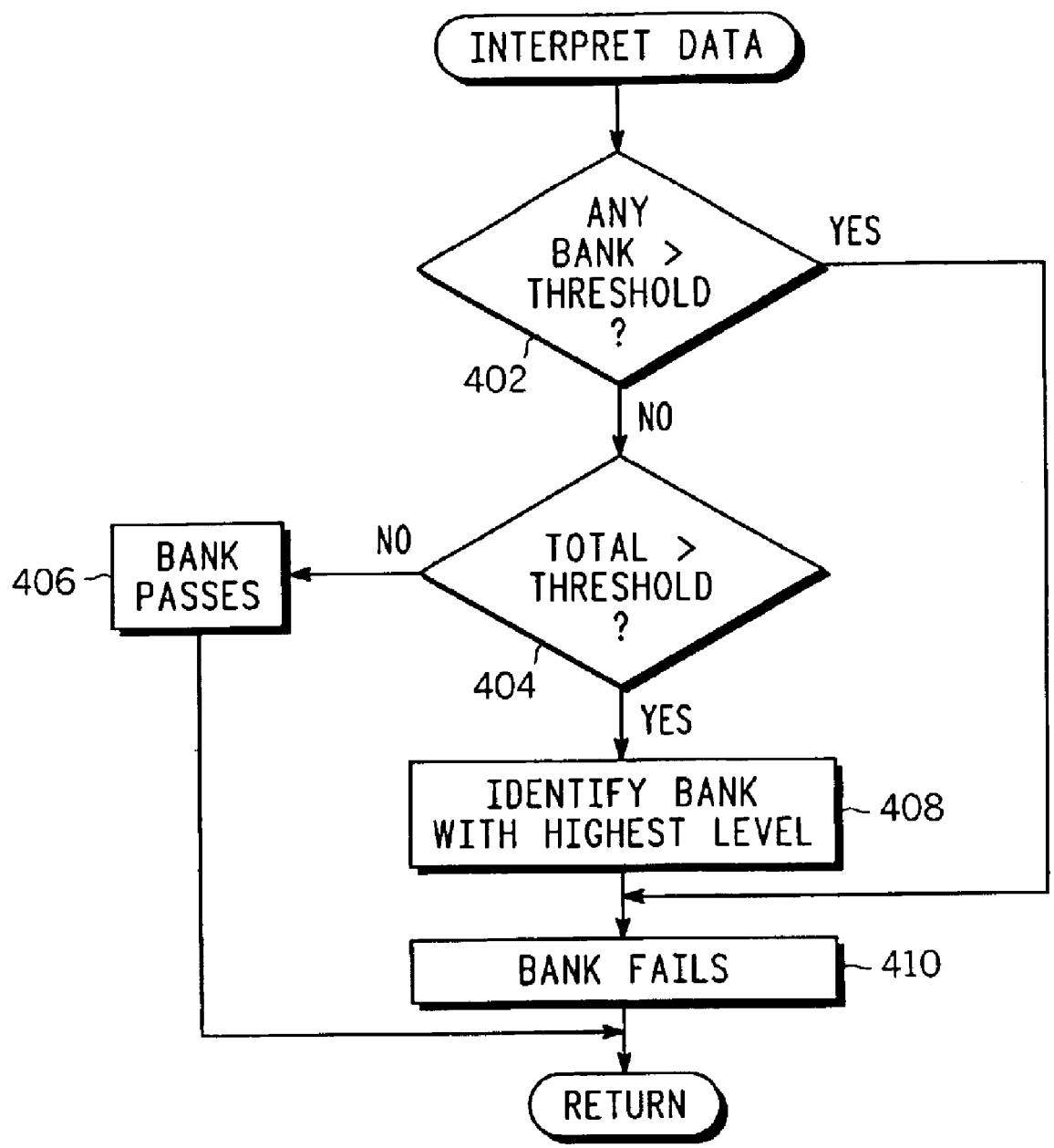
FIG. 4 is a flowchart of an exemplary process for interpreting scaled data.

With reference now to FIG. 4, an exemplary process 400 for interpreting the scaled values from each exhaust bank is shown. Process 400 may be carried out within controller 118 (FIG. 1A), and may be stored in digital memory or on any mass storage medium as a sequence of computer-executable instructions prepared in any executable or compilable computer language. The flowchart shown in FIG. 4 is intended as an exemplary routine that expresses the concepts of data interpretation as may be used with the present invention; other practical embodiments may include other logical arrangements or sequences of programming steps as appropriate.

Interpreting the scaled values (step 160 in FIG. 1B) suitably involves identifying whether either or both of the exhaust banks exceed the threshold limit for emissions. If any single bank (step 402) exceed the threshold, that bank may be immediately identified as failing the diagnosis (step 410), and the analysis terminates. Otherwise, the total emission value is compared to the threshold to determine the performance of the total system. If the total emission value exceeds the threshold (step 404), the bank with the highest scaled value (step 408) is identified as failing the diagnosis (step 410). If the total emissions value does not exceed the threshold, however, the banks are considered to pass the diagnosis (step 406), and no further processing is necessary. The results of the analysis may be provided to controller 118 in any manner, such as by setting a flag or by returning an appropriate parameter to the software program requesting the analysis.

Referring again to FIG. 1B, if the data interpretation routine identified that one or more banks failed the diagnosis (step 162), an appropriate response is triggered (step 164). Such a response may include activating a "check engine" light or other indicator on a dashboard display (or on any other operator interface) to notify the operator that the exhaust system should be checked. In such cases, the test results (including an identification of the bank failing the test) may be stored in a volatile or non-volatile memory so that the results can be retrieved and analyzed by a technician as appropriate.

Accordingly, the shortcomings of the prior art have been overcome by providing an improved technique for diagnosing multi-banked catalyst exhaust systems. The technique includes obtaining an emissions measurement (such as an OSC reading) from each bank in the system, and converting the measurements to a normalized value that can be added and compared to a threshold to determine if the overall system exceeds the threshold. If so, the operator can be notified via a display and any problems in the system can be readily corrected.

While exemplary embodiments have been presented in the foregoing detailed description of the invention, it should be appreciated that a vast number of equivalent variations exist. It should also be appreciated that these exemplary embodiments are only examples, and are not intended to limit the scope, applicability, or configuration of the invention in any way. Rather, the foregoing detailed description will provide a convenient road map for implementing an exemplary embodiment of the invention. Various changes may be made in the function and arrangement of elements described in an exemplary embodiment without departing from the scope of the invention as set forth in the appended claims and their legal equivalents.

What is claimed is:

1. A method of diagnosing emissions in a multi-banked emissions system, the method comprising the steps of:
    obtaining a plurality of emissions measurements, wherein each of the measurements corresponds to one bank of the multi-banked emissions system;
    converting each of the plurality of measurements to a scaled value as a percentage of a threshold value;
    adding the scaled values to obtain a total emission value for the multi-banked emissions system; and
    triggering an indication if the total emission value exceeds the threshold value.

2. The method of claim 1 wherein the emissions measurements comprise oxygen sensor readings.

3. The method of claim 2 wherein the threshold value is based upon a government-imposed limit.

4. The method of claim 1 wherein the scaling step comprises converting each emissions measurement to a percentage of a government-imposed limit.

5. The method of claim 4 wherein the converting step comprises referencing the emissions measurement in a lookup table.

6. The method of claim 1 wherein the triggering step further comprises providing the indication if any of the scaled values exceed the threshold value.

7. A method of diagnosing emissions in a multi-banked emissions system, the method comprising the steps of:
    obtaining an emissions measurement for each bank in the multi-banked emissions system;
    converting each of the emissions measurements to a scaled value;
    adding the scaled values to obtain a total emission value; and
    triggering an indication if the total emission value exceeds a predetermined maximum.

8. The method of claim 7 further comprising the step of triggering an indication if any of the scaled values exceeds the predetermined maximum.

9. The method of claim 7 wherein the emissions measurements comprise oxygen storage capacity measurements.

10. The method of claim 7 wherein the converting step comprises referencing the emissions measurement in a lookup table to obtain the scaled value.

11. A system for processing emissions from an engine in a motor vehicle, the system comprising:
    a plurality of exhaust banks, each of the exhaust banks comprising a catalytic converter configured to receive a portion of the exhaust produced by the engine and an oxygen sensor configured to monitor the level of oxygen present in the exhaust bank and to provide a measurement corresponding thereto; and
    a processor configured to receive the measurements from the oxygen sensors, to convert the measurements to scaled values as a percentage of a threshold value, to add the scaled values to compute a total emission value for the engine, and to trigger an indication if the total emission value exceeds the threshold value.

12. A system for processing emissions from an engine and for generating a display to an operator, the system comprising:
    a first exhaust bank coupled to the engine and having a first catalytic converter and a first oxygen sensor;
    a second exhaust bank coupled to the engine and having a second catalytic converter and a second oxygen sensor;
    a processor operatively coupled to the first and second oxygen sensors and to the display; and
    a digital memory in communication with the processor, the memory having instructions executable by the processor stored therein, wherein the instructions comprise:
        a first code module comprising instructions configured to obtain a first measurement from the first oxygen sensor and a second measurement from the second oxygen sensor;
        a second code module comprising instructions configured to convert the first and second measurements to first and second scaled values;
        a third code module comprising instructions configured to compute a total emission value as a function of the first and second scaled values; and
        a fourth code module comprising instructions configured to trigger an indication signal to the display if the total emission value exceeds a threshold.

13. The system of claim 12 wherein the digital memory further comprises a lookup table accessible by the second code module.

14. A system for diagnosing emissions in a multi-banked emissions system, the system comprising:
    means for obtaining a plurality of emissions measurements, wherein each of the measurements corresponds to one bank of the multi-banked emissions system;
    means for converting each of the plurality of measurements to a scaled value as a percentage of a threshold value;
    means for adding the scaled values to obtain a total emission value for the multi-banked emissions system; and
    means for triggering an indication if the total emission value exceeds the threshold value.

* * * * *